(12) United States Patent
Lin

(10) Patent No.: US 6,971,304 B1
(45) Date of Patent: Dec. 6, 2005

(54) COFFEE MAKING DEVICE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/996,826

(22) Filed: Nov. 24, 2004

(51) Int. Cl.[7] .............................. A47J 31/06; A47J 31/40
(52) U.S. Cl. .......................... 99/295; 99/302 R; 99/307
(58) Field of Search ........................ 99/495, 295, 302 R, 99/307, 289 R, 323, 323.3, 316, 317, 279, 99/304, 306; 222/189.11, 189.06, 146.5, 222/509, 146.2; 426/77–79, 112, 115

(56) References Cited

U.S. PATENT DOCUMENTS

| 2,205,290 | A | * | 6/1940 | Herrera | 99/302 R |
|---|---|---|---|---|---|
| 3,270,659 | A | * | 9/1966 | Tavera | 99/295 |
| 3,878,772 | A | * | 4/1975 | Nordskog | 99/295 |
| 5,638,741 | A | * | 6/1997 | Cisaria | 99/295 |
| 5,687,636 | A | * | 11/1997 | Diore et al. | 99/285 |
| 5,794,519 | A | * | 8/1998 | Fischer | 99/295 |
| 5,957,036 | A | * | 9/1999 | Warner et al. | 99/299 |
| 5,964,143 | A | * | 10/1999 | Driscoll et al. | 99/299 |
| 6,009,792 | A | | 1/2000 | Kraan | |
| 6,135,173 | A | * | 10/2000 | Lee et al. | 141/361 |
| 6,164,191 | A | * | 12/2000 | Liu et al. | 99/305 |
| 6,564,975 | B1 | * | 5/2003 | Garman | 222/189.11 |
| 6,681,960 | B2 | * | 1/2004 | Garman | 222/189.11 |
| 6,758,130 | B2 | * | 7/2004 | Sargent et al. | 99/295 |

* cited by examiner

Primary Examiner—Timothy F. Simone
(74) Attorney, Agent, or Firm—Alan D. Kamrath; Nikolai & Mersereau, P.A.

(57) ABSTRACT

A coffee making apparatus comprising a body, a cover, a T-shaped pipe and valve unit, a clamping unit resiliently secured to the cover, a rotation disc, a filter unit, a disc retainer threadedly secured to the cover, a housing fitted over the cover, and a knob rotatably fastening in the housing and the rotation disc. Placing a coffee bag in the filter unit, rotating the knob together with the rotation disc, and moving the clamping unit downward will press and fasten the coffee bag as hot water being supplied from the pipe and valve unit for mixing with the coffee bag. In the preparation process, steam accompanied hot water may flow back to a reservoir. Also, a distance between a cup of the filter unit and a base of the body is adapted to adjust by threadedly rotating the cup about a sleeve of the filter unit.

4 Claims, 6 Drawing Sheets

COFFEE MAKING DEVICE

FIELD OF THE INVENTION

The present invention relates to coffee makers and more particularly to a coffee making device with improved characteristics (e.g., steam leak prevention arrangement and more).

BACKGROUND OF THE INVENTION

Coffee makers are well known. U.S. Pat. No. 6,009,792, issued to Kraan, discloses an apparatus for preparing coffee in which an operating lip of a closing arrangement is connected to a closing lip and a free end of the closing lip hooks under a projection of the housing in a closed position. At this position, coffee extract is filled in a collecting reservoir prior to forming a good cafe creme. For opening the apparatus, a user may move a free end of the operating lip upwards for moving the closing lip downward. As such, the free end is detached from the projection. Also, a spring is adapted to facilitate the detaching operation.

But the above patent is unsatisfactory. Thus, continuing improvements in the exploitation of coffee maker are constantly being sought.

SUMMARY OF THE INVENTION

It is an object of the present invention to provide a coffee making apparatus having the advantages of being easily assembled or disassembled, simple in coffee preparation, and capable of preventing generated steam from leaking.

To achieve the above and other objects, the present invention provides a coffee making apparatus comprising a body, a cover, a pipe and valve unit, a clamping unit, a rotation disc, a disc retainer, a filter unit, a housing and a knob. The body comprises a removable rear reservoir, a flat front base, and an arcuate first recess at a front end of its top. The cover comprises a rear brace, a pair of first and second holes spaced apart with respect to the brace, a front circular opening, a plurality of cavities equally spaced around the opening, a plurality of receptacles each disposed between two adjacent ones of the cavities, a plurality of pairs of pegs wherein each pair of pegs are provided between two adjacent ones of the cavities, two opposite grooves on a bottom peripheral edge of the opening, and two opposite bars adjacent an intermediate edge of the cover, the bars being inserted into the first recess. The T-shaped pipe and valve unit has first and second ends inserted through the first and second holes respectively and a third end coupled to an outflow opening of a water heating device. The clamping unit resiliently is secured to the cover and fitted onto the opening, and comprises an upper disc including a plurality of projections equally spaced around, each projection including a top second recess, a first inclined surface inwardly directed, and a protrusion on a topmost portion of the first inclined surface, and an inlet; a perforated lower disc; and a rubber. The rotation disc is fitted onto the opening and comprises an arcuate groove, an annular first flange adjacent its peripheral edge, a second inclined surface matingly engaged with the first inclined surface, a notch on a lowest portion of the second inclined surface, and a third hole for the inlet being fitted therein. The filter unit comprises a circular hollow seat including an annular second flange having two opposite first slots, and a plurality of ribs on its inner wall; a sleeve including two opposite outwardly directed top latches inserted into the first slots for fastening and a bottom third flange directed inwardly; a cup including a top annular fourth flange directed outwardly and fitted over the third flange and a toothed section on a portion of its outer surface; a drum including a toothed section on its outer surface matingly engaged with the ribs; a disc-shaped strainer rested in the drum; a hollow bowl with the cup moveably fitted therein and including a plurality of lips equally spaced around its top circumferential edge, the lips being fitted in the grooves; and an arcuate handle threadedly secured to the bowl and including a top tab. The disc retainer is threadedly secured to the cover and having a plurality of engagement members rested on the first flange. The housing is shaped to fit over the cover and comprising a front second slot with the tab fastened therein. And the knob rotatably fastens in the housing and the rotation disc. Whereby place a coffee product to be extracted on the strainer, rotate the knob together with the rotation disc until the notch falls into the protrusion, and move the clamping unit downward will press the coffee product as hot water being supplied from the water heating device to the drum via the pipe and valve unit for mixing with the coffee product.

In one aspect of the present invention, the pipe and valve unit comprises an intermediate tee tube, first and second pipes at both sides of the tee tube, two valves disposed in the pipes, a first duct connected to one pipe, and a duct connected to the other pipe.

In another aspect of the present invention, steam accompanied hot water is adapted to flow back to the reservoir via the first pipe and hot water is adapted to flow to the drum via the second pipe.

In a further aspect of the present invention, a distance between the cup and the base is adapted to adjust by rotating the cup about the sleeve as the toothed section driving with respect to a tip end of the third flange.

The above and other objects, features and advantages of the present invention will become apparent from the following detailed description taken with the accompanying drawings.

DETAILED DESCRIPTION OF THE PREFERRED EMBODIMENTS

Figure 1:
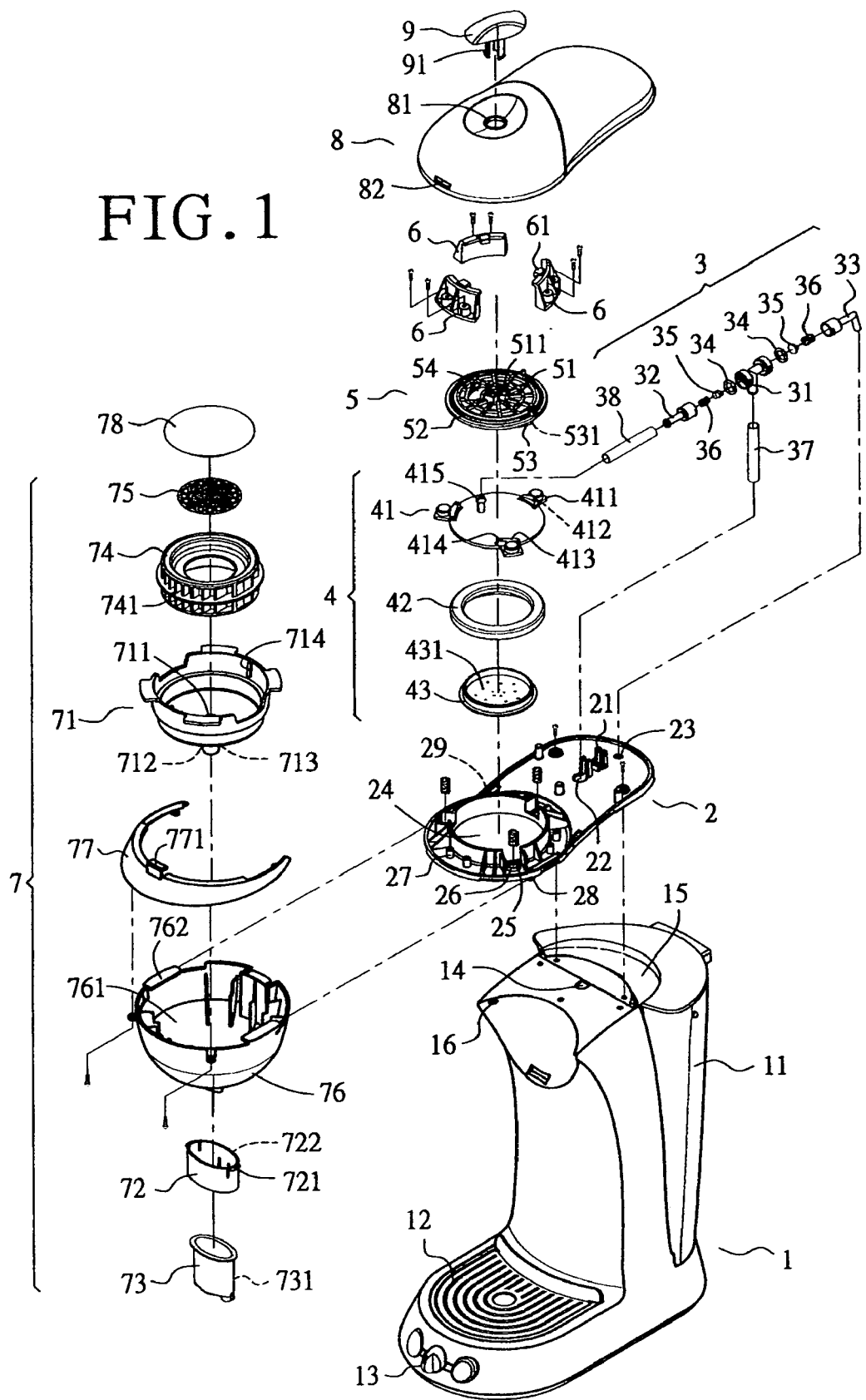
FIG. 1 is an exploded view of a preferred embodiment of a coffee making device according to the invention.
Figure 2:
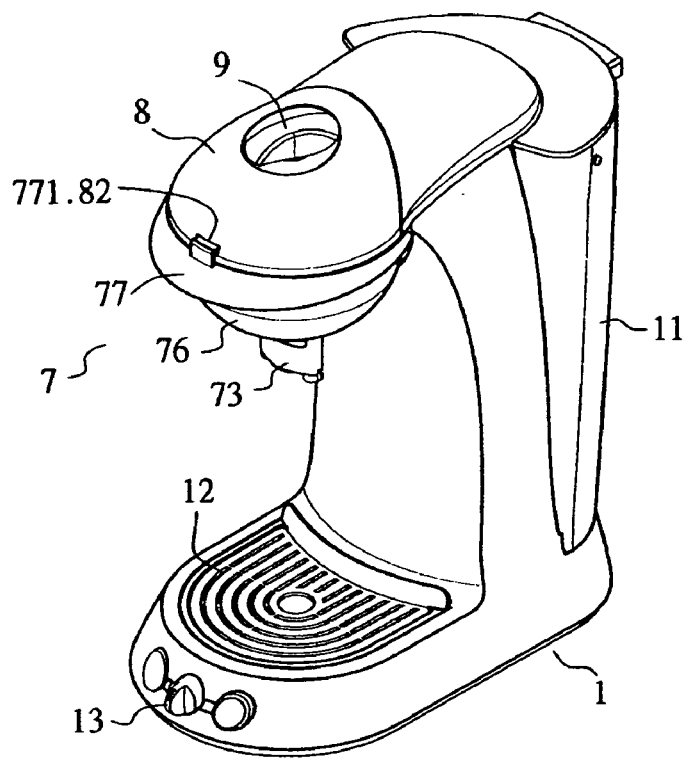
FIG. 2 is a perspective view of the assembled coffee making device.
Figure 5:
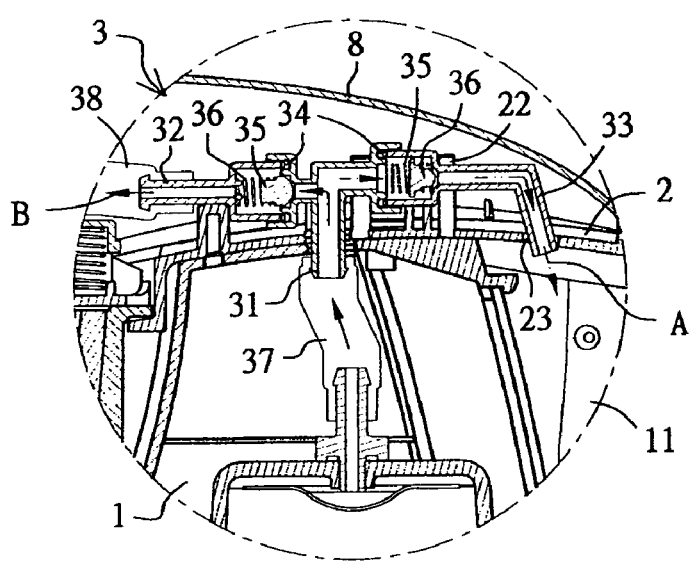
FIG. 5 is a detailed view of the area in circle I of FIG. 3 for illustrating operation of the pipe and valve unit.

Referring to FIGS. 1 to 8, there is shown a coffee making device constructed in accordance with a preferred embodiment of the invention comprising a body 1, a cover 2, a pipe and valve unit 3, a clamping unit 4, a rotation disc 5, a disc retainer 6, a filter unit 7, a housing 8, and a knob 9. Each component will be described in detailed below.

The body 1 comprises an internal motor (not shown) and heating device 10. The body 1 further comprises a removable rear reservoir 11 having a top opening 15 and a safety device (not shown). The safety device is adapted to automatically either switch the coffee making device to a standby mode when the reservoir 11 is removed or switch the coffee making device to a normal operating mode when the reservoir 11 is installed so as to send cold water to the heating device 10. The body 1 further comprises a flat front base 2, an on/off switch 13 on a front edge of the base 2, an arcuate recess 16 at a front end of the top, and a top hole 14 between the recess 16 and the opening 15.

The cover 2 comprises a rear brace 21, a pair of holes 22 and 23 spaced apart with respect to the brace 21, a front circular opening 24, a plurality of cavities 25 equally spaced around the opening 24, a plurality of receptacles 26 each disposed between two adjacent cavities 25, a plurality of pairs of pegs 27, two opposite grooves 28 on bottom peripheral edge of the opening 24, and two opposite bars 29 adjacent intermediate edge of the cover 2. The holes 22 and 23 are in communication with the hole 14 and the opening 15 respectively. Each pair of pegs 27 are provided between two adjacent cavities 25.

The T-shaped pipe and valve unit 3 comprises a tee tube 31, two pipes 32, 33 at both sides of the tee tube 31, two valve sets of O-ring 34, pin 35, and resilient member 36. Each valve set is disposed in the pipes 32 and 33 respectively.

The clamping unit 4 consists of an upper disc 41, a rubber ring 42 and a lower disc 43. The upper disc 41 includes three projections 411 equally spaced around and an upright inlet 415 on the top surface as a water inflow path. Each projection 411 includes a top recess 412, an inward inclined surface 413, and a protrusion 414 on a topmost portion of the inclined surface 413. The lower disc 43 has a plurality of apertures 431. The clamping unit 4 is shaped and sized to fit onto the opening 24 and the cavities 25.

The rotation disc 5 is slightly larger than the opening 24 and comprises an arcuate groove 51 having a stop 511 for being hooked by latched leg 91 of the knob 9, an annular flange 52 adjacent its peripheral edge with three engagement members 61 of the disc retainer 6 rested thereon, inclined surfaces 53 projecting from the bottom of the rotation disc 5 to be matingly engaged with the inclined surfaces 413 respectively, notches 531 each on a lowest portion of the inclined surface 53, and a hole 54 with the inlet 415 fitted therein.

The filter unit 7 comprises a circular hollow seat 71, a sleeve 72 of oval section, a cup 73 of oval section, a drum 74, a disc-shaped strainer 75, a bowl 76, an arcuate handle 77 and a cap 78. The hollow seat 71 includes a central opening 711, an annular flange 713 having two opposite slots 712, and a plurality of ribs 714 on its inner wall. The sleeve 72 includes two opposite outwardly directed top latches 721 inserted into the slots 712 for fastening and a flange 722 directed inwardly. The cup 73 includes a top annular flange directed outwardly so as to fit over the flange 722 and a toothed section 731 on a portion of its outer surface in which a relative positioning of the sleeve 72 and the cup 73 can be adjusted by rotating the cup 73 about the sleeve 72 as the toothed section 731 driving with respect to the tip end of the flange 722 (see FIG. 8). The drum 74 includes a toothed section 741 on its outer surface matingly engaged with the ribs 714. The disc-shaped strainer 75 is held by the drum 74. The bowl 76 includes a central opening 761 with the cup 73 moveably fitted therein and a plurality of lips 762 equally spaced around its top circumferential edge. The lips 762 are fitted in the grooves 28. The handle 77 is threadedly secured to the bowl 76 and including a top tab 771.

The housing 8 is shaped to fit over the cover 2 and comprises a front slot 82 with the tab 771 fastened therein and a top hole 81 with two latched legs 91 of the knob 9 inserted thereinto for rotatably fastening onto the housing 8.

Figure 3:
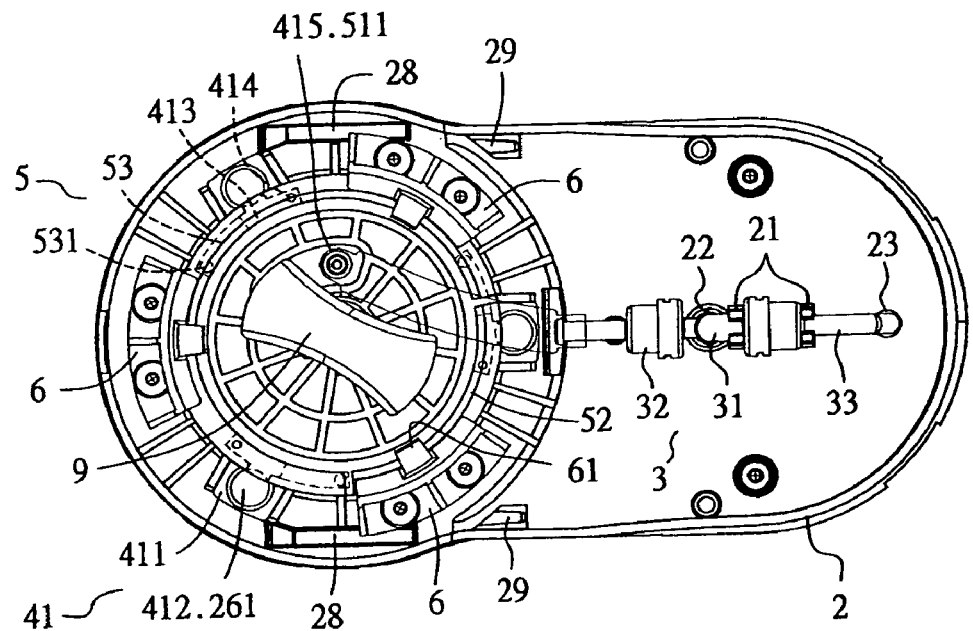
FIG. 3 is a sectional view of upper portion of the coffee making device shown in FIG. 2.
Figure 3:
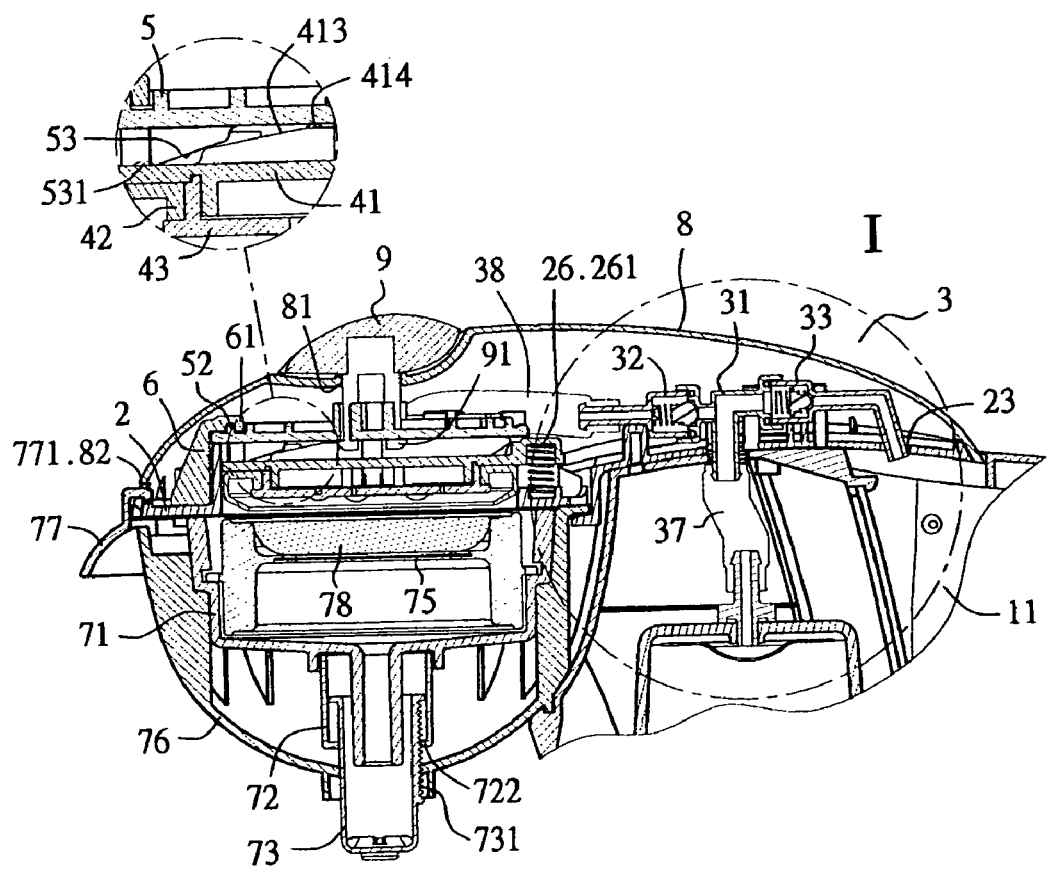

Assembly of the invention will be described in detailed below by referring to FIGS. 1 and 3. First, insert the bars 29 into two end holes of the recess 16. Next, drive screws to secure the cover 2 to the clamping unit 4. Next, mount the cover 2 and the clamping unit 4 onto the top of the body 1. Next, insert one portion of the tee tube 31 into the hole 22. Next, couple one end of a first duct 37 to the tee tube 31 and couple the other end thereof to an outflow opening of the heating device. Next, insert the pipe 33 into the hole 23. A plurality of springs 261 are then inserted into the receptacles 226. Next, press the recesses 412 onto the springs 261 for anchoring. Next, put the rotation disc 5 onto the opening 24. Next, put the engagement members 61 on the flange 52. Next, drive screws into the pegs 27 for securing the disc retainer 6 onto the cover 2. Next, connect the second duct 38 to the tube 415. Next, fit the lips 762 in the grooves 28. Next, insert the tab 771 into the slot 82 for fastening. Finally, insert the latched legs 91 into the hole 81 for fastening the knob 9 at the rotation disc 5.

Figure 4:
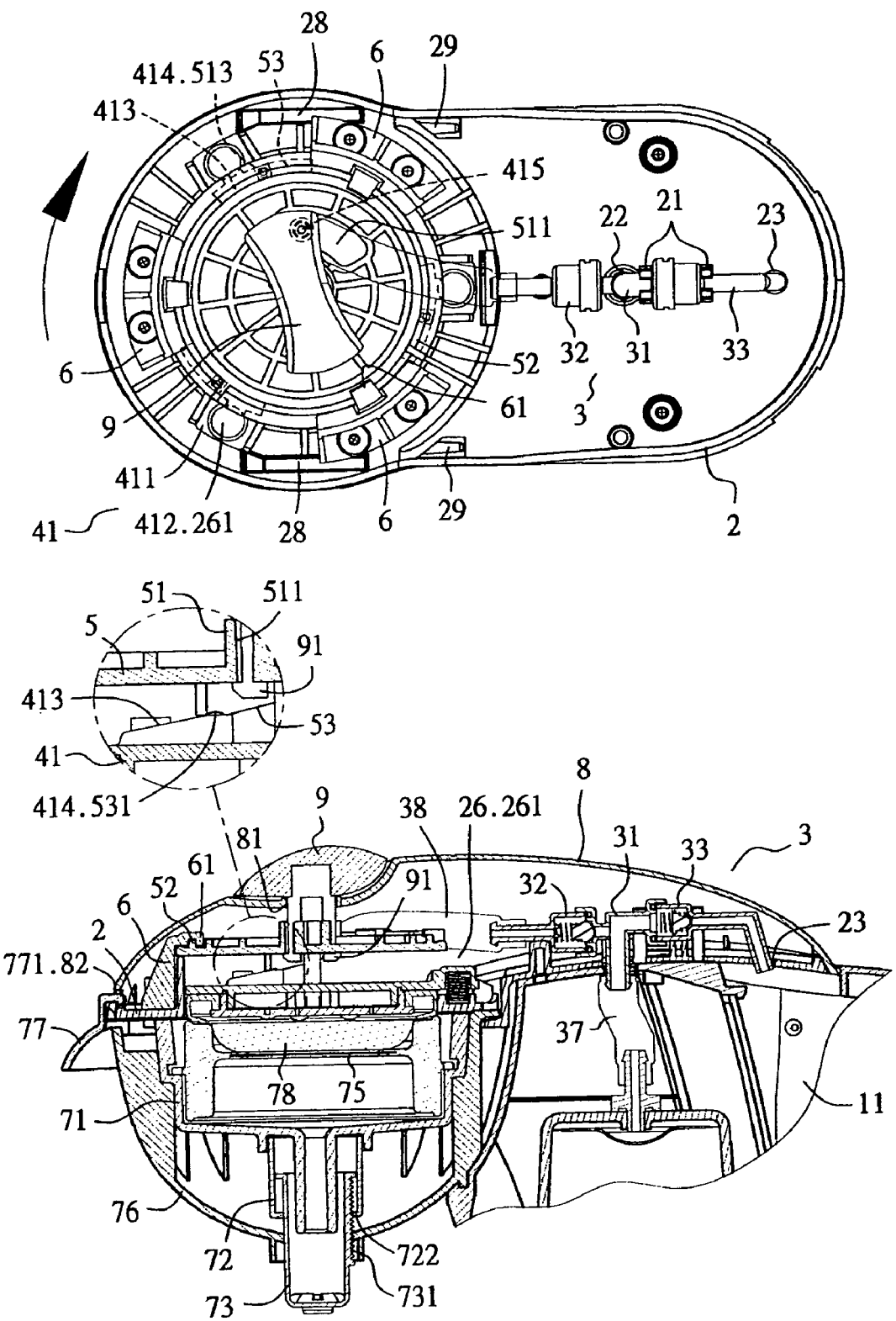
FIG. 4 is a view similar to FIG. 3 where the knob is rotating.

An operation of the invention will be described in detailed below by referring to FIGS. 4, 6, and 8. First, place a coffee bag 78 on the strainer 75. Next, rotate the knob 9 together with the rotation disc 5 until the notch 531 falls into the protrusion 414 for fastening. As such, moving the clamping unit downward will press the coffee bag 78. Hot water is supplied from the heating device to the drum 74 via the pipe and valve unit 3 when both the heating device and the motor activate. Advantageously, the above configuration of the invention can prevent steam generated during coffee preparation from leaking. Next, coffee extract mixed with hot water falls into the cup 73 to form a coffee creme. Finally, coffee creme flows out of the cup 73 into a carafe C placed on the base 12. Note that steam A may flow back to the reservoir 11 via the pipe 33 and hot water B may flow to the coffee bag 78 via the pipe 32 during the heating (i.e., coffee preparation) process (see FIG. 5).

Figure 6:
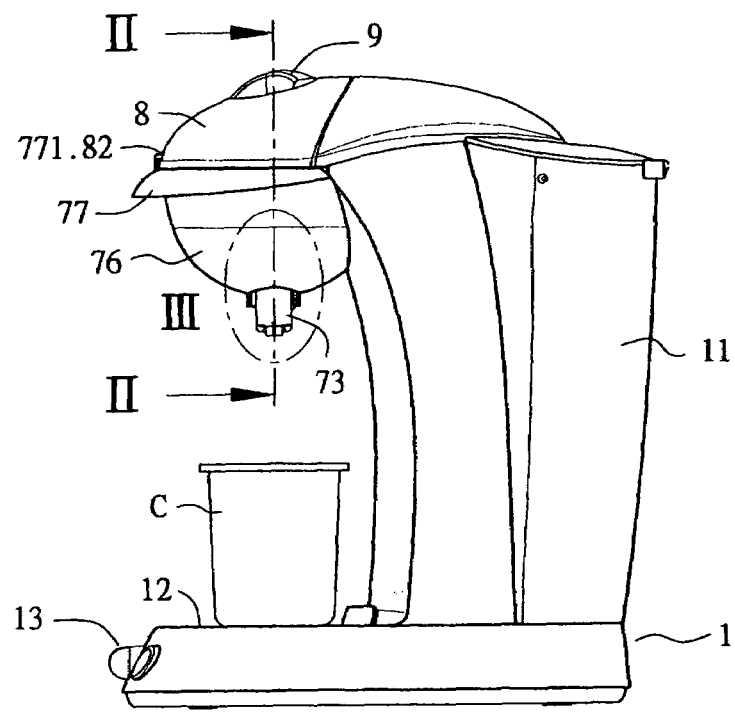
FIG. 6 is a side view of the coffee making device of FIG. 2 where a carafe is placed on its base.
Figure 7:
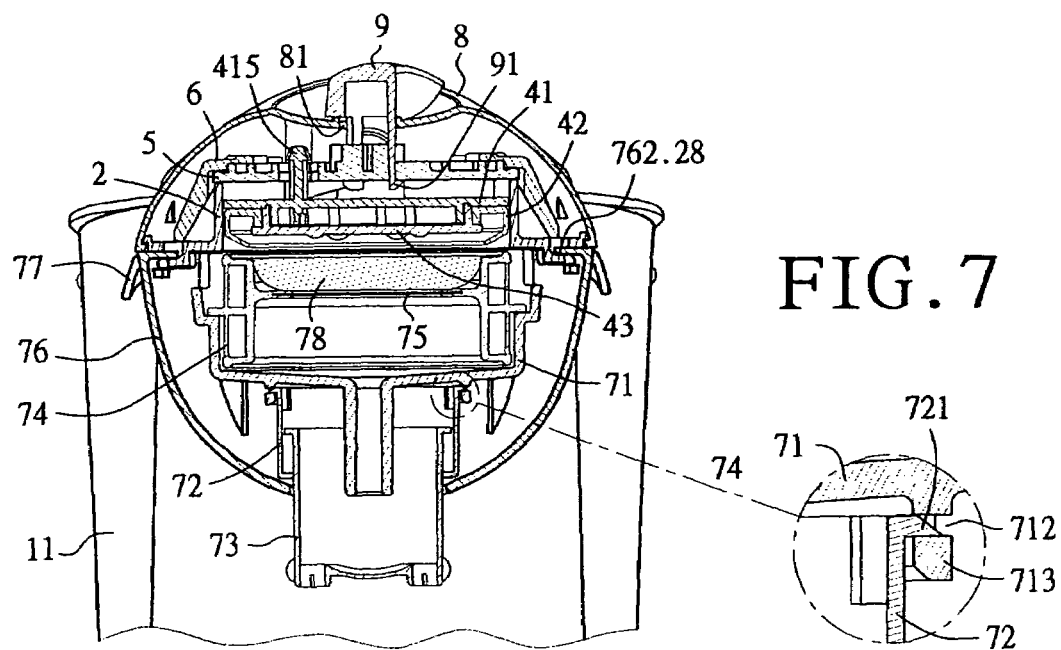
FIG. 7 is a sectional view taken along line II—II of FIG. 6.
Figure 8:
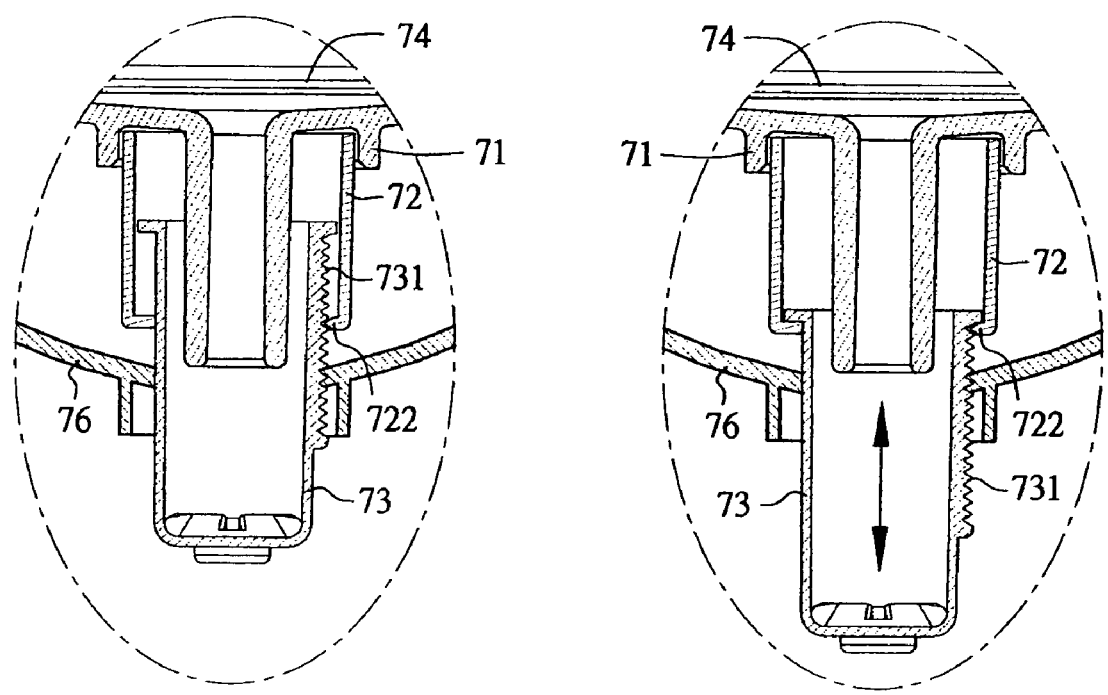
FIG. 8 is a detailed view of the area in circle III of FIG. 6 for illustrating upward and downward movements of the cup.

A distance between the cup 73 and the carafe C placed on the base 12 can be adjusted by rotating the cup 73 about the sleeve 72 as the toothed section 731 driving with respect to the tip end of the flange 722 (see FIGS. 6 and 8). Such adjustment aims at preventing hot coffee creme from spilling.

The benefits of the invention include easy assembly and disassembly for ease of cleaning and simple rotation of the knob 9 for fastening the coffee bag 78 so as to prevent steam generated during coffee preparation from leaking.

While the invention herein disclosed has been described by means of specific embodiments, numerous modifications and variations could be made thereto by those skilled in the art without departing from the scope and spirit of the invention set forth in the claims.

What is claimed is:

1. A coffee making apparatus comprising:
    a body comprising a removable rear reservoir, a flat front base, and an arcuate first recess at a front end of its top;
    a cover comprising a rear brace, a pair of first and second holes spaced apart with respect to the brace, a front circular opening, a plurality of cavities equally spaced around the opening, a plurality of receptacles each disposed between two adjacent ones of the cavities, a plurality of pairs of pegs wherein each pair of pegs are provided between two adjacent ones of the cavities, two opposite grooves on a bottom peripheral edge of the opening, and two opposite bars adjacent an intermediate edge of the cover, the bars being inserted into the first recess;

a T-shaped pipe and valve unit having first and second ends inserted through the first and second holes respectively and a third end coupled to an outflow opening of a water heating device;

a clamping unit resiliently secured to the cover and fitted onto the opening, and comprising an upper disc, a perforated lower disc and a rubber ring, said upper disc including a plurality of projections equally spaced around and an inlet, each projection including a top second recess, a first inwardly inclined surface and a protrusion on a topmost portion of the first inclined surface;

a rotation disc fitted onto the opening and comprising an arcuate groove, an annular first flange adjacent its peripheral edge, second inclined surfaces matingly engaged with the first inclined surfaces respectively, a notch on a lowest portion of the second inclined surface, and a third hole for the inlet being fitted therein;

a filter unit comprising a circular hollow seat including an annular second flange having two opposite first slots, and a plurality of ribs on its inner wall; a sleeve including two opposite outwardly top latches inserted into the first slots for fastening and a third flange directed inwardly; a cup including a top annular fourth flange directed outwardly and fitted over the third flange and a toothed section on a portion of its outer surface; a drum including a toothed section on its outer surface matingly engaged with the ribs; a disc-shaped strainer rested in the drum; a hollow bowl with the cup moveably fitted therein and including a plurality of lips equally spaced around its top circumferential edge, the lips being fitted in the grooves; and an arcuate handle threadedly secured to the bowl and including a top tab;

a disc retainer threadedly secured to the cover and having a plurality of engagement members rested on the first flange;

a housing shaped to fit over the cover and comprising a front second slot with the tab fastened therein; and a knob rotatably fastening in the housing and the rotation disc;

whereby placing a coffee product to be extracted on the strainer, rotating the knob together with the rotation disc until the notch falls into the protrusion, and moving the clamping unit downward will press the coffee product as hot water being supplied from the water heating device to the drum via the pipe and valve unit for mixing with the coffee product.

2. The coffee making apparatus of claim 1, wherein the pipe and valve unit comprises an intermediate tee tube, first and second pipes at both sides of the tee tube, two valves disposed in the pipes, a first duct connected to one pipe, and a duct connected to the other pipe.

3. The coffee making apparatus of claim 2, wherein steam accompanied hot water is adapted to flow back to the reservoir via the first pipe and hot water is adapted to flow to the drum via the second pipe.

4. The coffee making apparatus of claim 1, wherein a distance between the cup and the base is adapted to adjust by rotating the cup about the sleeve as the toothed section driving with respect to a tip end of the third flange.

* * * * *